US008554735B1

United States Patent
Wible et al.

(10) Patent No.: US 8,554,735 B1
(45) Date of Patent: Oct. 8, 2013

(54) SYSTEMS AND METHODS FOR DATA UPLOAD AND DOWNLOAD

(75) Inventors: Cullin Wible, Norwalk, CT (US); Erik Zamkoff, Fairfield, CT (US); Frederick Clark, New York, NY (US); Christopher Giordano, New York, NY (US)

(73) Assignee: MiMedia LLC, Wilmington, DE (US)

( * ) Notice: Subject to any disclaimer, the term of this patent is extended or adjusted under 35 U.S.C. 154(b) by 53 days.

(21) Appl. No.: 13/103,693

(22) Filed: May 9, 2011

Related U.S. Application Data

(63) Continuation-in-part of application No. 12/473,128, filed on May 27, 2009, now Pat. No. 8,090,690.

(51) Int. Cl.
  *G06F 17/30* (2006.01)

(52) U.S. Cl.
  USPC .......................................................... 707/640

(58) Field of Classification Search
  USPC ....................... 707/2, 3, 640; 725/41; 382/166
  See application file for complete search history.

(56) References Cited

U.S. PATENT DOCUMENTS

| | | | |
|---|---|---|---|
| 5,835,953 | A | 11/1998 | Ohran |
| 7,035,943 | B2 | 4/2006 | Yamane et al. |
| 7,509,684 | B2 | 3/2009 | McDonald et al. |
| 7,660,834 | B2 | 2/2010 | Cannon et al. |
| 8,095,606 | B1 | 1/2012 | Wiley et al. |
| 2002/0083366 | A1 | 6/2002 | Ohran |
| 2002/0133387 | A1 | 9/2002 | Wilson et al. |
| 2004/0158546 | A1 | 8/2004 | Sobel et al. |
| 2004/0236859 | A1 | 11/2004 | Leistad et al. |
| 2006/0015637 | A1 | 1/2006 | Chung |
| 2006/0036611 | A1 | 2/2006 | Rothschild |
| 2006/0155790 | A1 | 7/2006 | Jung et al. |
| 2006/0179079 | A1 | 8/2006 | Kolehmainen |
| 2006/0230440 | A1 | 10/2006 | Wu et al. |
| 2006/0277123 | A1 | 12/2006 | Kennedy et al. |
| 2006/0288168 | A1 | 12/2006 | Stevenson |
| 2006/0291720 | A1 * | 12/2006 | Malvar et al. ................. 382/166 |
| 2007/0106714 | A1 | 5/2007 | Rothbarth |
| 2007/0130400 | A1 | 6/2007 | Reisman |
| 2007/0296581 | A1 | 12/2007 | Schnee et al. |
| 2008/0022058 | A1 | 1/2008 | Nadathur et al. |
| 2008/0082678 | A1 | 4/2008 | Lorch et al. |
| 2008/0109414 | A1 | 5/2008 | Chun et al. |
| 2008/0222734 | A1 | 9/2008 | Redlich et al. |
| 2008/0306872 | A1 | 12/2008 | Felsher |
| 2009/0019486 | A1 * | 1/2009 | Kalaboukis ..................... 725/41 |
| 2009/0024675 | A1 | 1/2009 | Hewitt et al. |

OTHER PUBLICATIONS

International Search Report and Written Opinion issued for PCT/US2010/036105, dated Jul. 13, 2010, 12 pages.

* cited by examiner

*Primary Examiner* — Etienne Leroux
(74) *Attorney, Agent, or Firm* — Fulbright & Jaworski LLP

(57) ABSTRACT

Systems and methods which provide a hybrid network based solution for digital data file backup are shown. Embodiments utilize a transport mass storage system to provide transmission of digital data files between user equipment and a network based mass storage system. The transport mass storage system for physically transporting digital data files may be used in combination with other techniques for communicating digital data files, such as transmission of digital data files through a network link. A manifest and/or other information may be used to manage transporting, storage, and/or synchronization of digital data files. User equipment may then access the digital data files stored to the network mass storage system for various purposes using a network link. Subsequent, incremental backups and other transfers of relatively small amounts of digital data files are preferably accomplished using a network link for the transfer.

33 Claims, 3 Drawing Sheets

SYSTEMS AND METHODS FOR DATA UPLOAD AND DOWNLOAD

CROSS-REFERENCE TO RELATED APPLICATIONS

The present application is a continuation-in-part of co-pending, commonly assigned, patent application Ser. No. 12/473,128 entitled "SYSTEMS AND METHODS FOR DATA UPLOAD AND DOWNLOAD," filed May 27, 2009, the disclosure of which is hereby incorporated herein by reference.

TECHNICAL FIELD

The present invention relates generally to data transmission and, more particularly, to techniques for data upload and/or download.

BACKGROUND OF THE INVENTION

The amount of data stored digitally has increased dramatically in recent years. In addition to the more traditional data files utilized by computing systems, such as the nearly ubiquitous personal computers (PCs), various forms of media have now begun to be commonly stored in digital form. For example, digital photographs have all but replaced traditional film based photographs. Likewise, digital music files have become the predominant form for transmission, distribution, and storage of music content. Multimedia files, containing sound and images, have become readily accepted as a preferred way to transmit, distribute, and store content such as commercial and home movies. Accordingly, it is not unusual for even a casual user of technology to amass a large collection of digital files, perhaps including digital photos, digital music, digital movies, databases, office productivity files, etc. Similarly, businesses, including small businesses and home based businesses, have large amounts of digital files.

In order to accommodate the storage of such digital files, a typical PC system of today generally includes a mass storage system (e.g., hard disk drive) providing 200-300 gigabytes or more of storage. Similarly, other devices which utilize digital data files typically include, or have associated therewith, large mass storage systems. For example, it is not uncommon for personal entertainment systems (PESs), such as a MP3 player or IPOD, personal digital assistants (PDAs), such as a BLACKBERRY or IPAQ, personal communication systems (PCSs), such as an IPHONE or other smartphone, to include 100 gigabytes or more of storage.

Although the intangible nature of such digital data files has provided advantages in transmission, storage, and access to information, their use is not without disadvantage. For example, users have often discovered that such digital data files may be damaged, corrupted, or otherwise lost, thereby preventing access to their data. It is not uncommon for a mass storage system or its host system (e.g., PC, PES, PDA, PCS, etc.) to fail or be damaged to an extent that digital data files are not recoverable. Similarly, such systems may themselves be lost or stolen, taking their digital data files with them. Accordingly, users have begun to realize that implementing some sort of digital data file archiving or duplication process (often referred to as "backup" or "backing up") is important to digital data file security.

A traditional technique for providing digital data file backup is to provide a second, external mass storage system, such as a second hard disk drive of appropriate storage capacity, and make a copy of the digital data files to be backed up on that second mass storage system. This solution has not provided an ideal solution for providing digital data file backup for a number of reasons. For example, the user must acquire, interface, and maintain the duplicate or second mass storage system, which results in added cost and effort. Moreover, the process of identifying the particular digital data files for duplicating on the second mass storage system, managing the duplication process, and periodically supplementing the backed up digital data files with new or modified digital data files is often overwhelming for many users. A further disadvantage of the use of the aforementioned second mass storage system is that it is typically stored with or near the host system it is used to backup. Thus, if the host system is rendered inoperable (e.g., due to fire, electrical surge, lightning strike, computer virus, etc.) or is otherwise unavailable (e.g., due to loss, theft, etc.), the second mass storage system containing the backup digital data files is likewise unavailable or inoperable. Additionally, as with the host system, external mass storage systems are vulnerable to breakage and drive failure, the timing of which is difficult to predict.

A more recent technique for providing digital data file backup is to utilize a network based solution (often referred to as "cloud computing"). For example, a network based mass storage system, such as may be provided by an Internet based storage service, is utilized to provide storage of duplicate copies of digital data files. A host system provided with an appropriate network connection may thus upload a copy of the digital data files to be backed up to the network based mass storage system through the network. This technique has the advantage of providing additional mass storage without the user having to acquire and maintain a second mass storage system. Such a network based system also provides a higher level of data security because data is stored offsite, in data centers with redundant and often geo redundant server architectures. Because the additional mass storage is provided in the network "cloud," issues with the backed up digital data files being destroyed, lost, stolen, or otherwise unavailable with the user's host system are mitigated. However, this solution has not provided an ideal solution for providing digital data file backup for a number of reasons. For example, the process of identifying the particular digital data files for duplicating on the second mass storage system, managing the duplication process, and periodically supplementing the backed up digital data files with new or modified digital data files continues to often be overwhelming for many users.

Perhaps the greatest impediment to the use of a network based solution is the time and network resources required for backing up large amounts of digital data files. Typical broadband Internet connections, as would be utilized for a cloud computing backup system, are asymmetrical (e.g., the downlink often provides on the order of 10 times the throughput as the uplink, such as ADSL over plain old telephone service (POTS) lines theoretically providing 12 Mbit/s downlink and 1.3 Mbit/s uplink). Such asymmetrical broadband Internet connections, such as provided by asymmetric digital subscriber line (ADSL) and cable Internet links, readily accommodate the downloading of Internet content (e.g., web pages) and the small amount of uplink data used to navigate and access such Internet content. However, asymmetrical broadband Internet connections do not provide an optimal interface for uploading large amounts of data as is done using a network based digital data file backup solution. For example, the links often do not meet the theoretical throughputs, but rather provide much lower effective throughput, such as due to noisy links, collisions with other network traffic, host computer multitasking, dropped links which must be reestablished, etc.

Accordingly, transferring copies of 100 gigabytes of digital data files (an amount which, as discussed above, is not uncommon even for a casual user) to a network based mass storage system using such an asymmetrical broadband Internet connection has been found to often take from 28-30 days.

Moreover, user behavior with respect to user equipment for which data backup is performed often has a significant impact on the time required for transmission of data to a network based backup solution. For example, a user may elect (whether overtly or through use of the user equipment) not to have 100% of the available bandwidth available for use in data transmission to a cloud computing backup system, thereby lengthening the time required for data transfer. Moreover, the user behavior (e.g., shutting down of the computer, placing the computer into hibernation, etc.) may render the user equipment unavailable for data transmission. As can be readily appreciated from the foregoing, user behavior may have a significant impact upon the time needed for data transfer to a cloud computing backup system, irrespective of the bandwidth theoretically available for such data transfer.

A lengthy transfer of data is not conducive to a good user experience. For example, the use of the host system and/or other system utilized for the data uploading is substantially impacted by the data transfer. Similarly, other systems utilizing the network link (e.g., other PCs linked to the Internet through the same broadband connection) may be negatively impacted by the reduced availability of the network link. If the network link suffers an interruption or other anomaly, the data transfer may halt until the user restarts the data transfer. Such network interruptions are not uncommon, particularly within the number of days required for the data transfer, and can result in appreciable delay between the interruption and the resuming of data transfer. Thus the actual time required for completion of the data transfer may be extended for hours and even days.

Further exacerbating the foregoing disadvantages associated with the use of a network based solution for digital data file backup are the restrictions on network use often implemented by Internet service providers (ISPs) and/or other service providers. Broadband network links are often trunked or otherwise shared among different users or user entities. For example, although ADSL links typically provide a private (unshared) link between the central office (CO) and the customer premise, the link between the CO and the Internet point-of-presence (POP) are typically trunked (shared). Cable interne links are typically shared for all but the last few feet completing the link to the customer premise. Accordingly, ISPs and other service providers (e.g., carriers) have begun implementing caps or limits on data transfer to prevent one or a few users from monopolizing the shared resources to the detriment of other users. Even if such service providers wished to accommodate data transfers for backup purposes, it is difficult for the service providers to distinguish between network consumption for legitimate data backup purposes and the less desirable, but equally network resource intensive, peer-to-peer exchange of music or movie content. Accordingly, service providers have blindly implemented decreases in available bandwidth and/or temporary termination of network links where a user is consuming more than some threshold amount of bandwidth for a period of time. Such restrictions negatively impact the already poor user experience associated with the use of network based solutions for digital data file backup available today.

BRIEF SUMMARY OF THE INVENTION

The present invention is directed to systems and methods which provide a hybrid network based solution for digital data file backup. Embodiments of the invention utilize a transport mass storage system, such as may comprise a hard disk drive, flash memory, and/or other non-volatile mass storage media, to provide transmission of digital data files between user equipment, such as PCs, PESs, PDAs, PCSs, wireless handsets, digital video recorders (DVRs), etc., and a network based mass storage system, such as may be provided by an Internet based storage service. The transport mass storage system is preferably used to physically transport a large volume of digital data files (whether only some or all such digital data files) to be stored, or backed up, to the network mass storage system. User equipment may then access the digital data files stored to the network mass storage system using a network link, such as for data restoring, remote file access, transferring data to a new host, etc. Additionally or alternatively, transfer of digital data files may be accomplished using a network link for the transfer, such as to provide digital data file transfer during a time in which the transport mass storage system is in transit, to facilitate subsequent, incremental backups (e.g., transfers of modified or added files), and other desired transfers of digital data files.

According to an embodiment of the invention, a user subscribes to a hybrid network based digital data file backup service and may be provided a transport mass storage system for physically transporting digital data files to be stored, such as by overnight courier. Once received, this transport mass storage system may be coupled to one or more of the user's systems for copying of digital data files onto the transport mass storage system. The digital data files are preferably encrypted or otherwise protected when stored on the transport mass storage system. The transport mass storage system may then be returned to a network based digital data file backup service facility for copying of the digital data files to systems of the network based mass storage system.

The foregoing transport mass storage system for physically transporting digital data files may be used in combination with other techniques for communicating digital data files, such as transmission of digital data files through a network link. For example, during a time in which a transport mass storage system is in transit to a user, during a time in which digital data files are being stored to a transport mass storage system, and/or during a time in which a transport mass storage system is in transit to a network based mass storage system facility, an instruction set (e.g., software, firmware, etc.) providing network based backup services may transmit a user's digital data files through a network link to a network based mass storage system. Such a combination of digital data file communication techniques (e.g., physical transport using the transport mass storage system and electronic transport using the network link) may be particularly desirable in facilitating immediate backup of particularly important digital data files, in facilitating the ability of the user to more quickly experience the features and benefits of the network based mass storage system, and/or in facilitating utilization of available network resources for digital data file transmission all while facilitating an improved user experience with respect to a large amount of digital data files (e.g., digital data files of lesser importance).

The transport mass storage system may be configured with an instruction set, such as in the form of software and/or firmware stored in the transport mass storage system, to facilitate copying appropriate digital data files from selected user equipment to the transport mass storage system. Additional or alternative instruction sets and/or other data may be carried by transport mass storage systems of embodiments. For example, user information, such as may be utilized to confirm the identity of the user and/or one or more host systems, to identify digital data files to be backed up, to associate backed up digital data files with the appropriate user, etc., may be stored by a transport mass storage system. Likewise, security information, such as a public cryptographic keys, cryptographic key identifiers, passwords, etc., may be stored by a transport mass storage system. Additional software, such as software to facilitate incremental or other subsequent digital data file backup operations (e.g., using network links for transmitting digital data files), may be transported to the user equipment by a transport mass storage system of embodiments. Alternative embodiments may operate to provide one or more of the foregoing instruction sets and/or other data by means other than a transport mass storage system, such as by downloading instruction sets and/or other data via a network link (e.g., during a registration session).

An instruction set, whether stored by the transport mass storage system of the foregoing embodiment or otherwise available to a host system for which network based digital data file backup services are to be provided, may be configured to "auto-run" or otherwise automatically launch upon interfacing with user equipment. Additionally or alternatively, such an instruction set may be manually initiated or otherwise invoked, as desired. Such an instruction set (e.g., software) may confirm the user's identity and/or that it is interfaced with an expected or appropriate host or hosts (or other source of digital data files). Thereafter, operation of the instruction set may identify digital data files to be backed up, perhaps using some level of input from a user and/or algorithms and data for identifying appropriate data files, and copy the identified digital data files to the transport mass storage system. The foregoing operation in accordance with embodiments essentially results in the backing up of data being a "plug and play" operation.

Operation of the foregoing instruction set may additionally provide communication with systems of the network based mass storage system, such as to facilitate synchronization with respect to transport of digital data files using a combination of digital data file communication techniques (e.g., physical transport using the transport mass storage system and electronic transport using the network link). For example, information regarding the particular digital data files being copied to the transport mass storage system may be provided to a server of the network based mass storage system. This information may be utilized to ensure that digital data files which are updated while the transport mass storage system is in transit are properly synchronized between the user's systems and those of the network based mass storage system. For example, such updated digital data files may be communicated using the aforementioned network link while the transport mass storage system is in transit and the foregoing information regarding the particular digital data files copied to the transport mass storage system used to identify particular files stored by the transport mass storage system which are not to be used to overwrite digital data files stored by the network based mass storage system.

After the identified digital data files have been copied to the transport mass storage system, the transport mass storage system of the foregoing embodiment is transported to a network based mass storage system portal, such as by overnight courier, for copying to a network based mass storage system. Once the digital data files have been copied to the network based mass storage system, the transport mass storage system of embodiments is processed to remove user data, such as by formatting, overwriting data, etc. and may be subsequently used to provide transportation of other user data. The hybrid network based digital data file backup service may provide a communication to the user, such as by email, voice mail, short message service (SMS), desktop alert, etc., that backing up of the digital data files has been completed and the files are available for use by the user.

Embodiments of the invention utilize a manifest to manage transporting and/or storage of digital data files. For example, during operation identifying digital data files for backing up and/or copying digital data files to a transport mass storage system (e.g., upon a user registering for a network based backup service and/or upon a network based backup service being invoked to backup data), embodiments of the invention may create a manifest including information such as identification of the digital data files backed up, file size information, cryptographic key information, user identification information, host system information, etc. Such a manifest can be stored on the transport mass storage system, along with the digital data files, for use by the hybrid network based digital data file backup service. For example, manifest information may be used to confirm that all the digital data files have been received, to provide a digital record of all files being transported, to provide information with respect to the storage resources needed for the files, to confirm that the files have not been corrupted or altered, to associate the digital data files with the appropriate user's account, etc. Such a manifest comprise, or may be utilized in combination with, the aforementioned information regarding the particular digital data files copied to the transport mass storage system communicated to the network based mass storage system for proper synchronization of the user's digital data files when a combination of digital data file communication techniques (e.g., physical transport using the transport mass storage system and electronic transport using the network link) are used.

Embodiments of the invention operate to communicate the foregoing manifest electronically, such as through a network link, from the user equipment to the hybrid network based digital data file backup service. For example, a manifest may be communicated electronically upon completion of operation copying the digital data files to the transport mass storage system, such as to facilitate making an appropriate amount of storage in the network based mass storage system available for the later arrival of the transport mass storage system transporting the digital data files. Additionally or alternatively, a manifest transmitted separately from the transport mass storage system may be utilized to provide a digital record of all files being transported, to verify that the digital data files transported by a corresponding transport mass storage system have not been altered, corrupted, etc.

Having stored copies of the user's digital data files to the network based mass storage system of a hybrid network based digital data file backup service, embodiments of the invention facilitate various uses of and operations with the digital data files. For example, the user may from time-to-time supplement the backed up digital data files, such as through regularly scheduled and/or ad hoc incremental digital data file backup operations. Such incremental digital data file backup operations preferably provide for transmission of appropriate digital data files through a network link, although some incremental digital data file backup operations (e.g., those involving a large amount of data or subsequent "full" backup operations) may again utilize a transport mass storage system for transporting some or all digital data files to be backed up. A user may access the digital data files stored by the network based mass storage system, such as to restore data to user equipment, to transfer data to different user equipment, to remotely access data, etc. The hybrid network based digital data file backup service may additionally or alternatively provide operations with respect to the digital data files, such as to organize, catalog, or otherwise manage the files, augment, correct, or otherwise process data of the files, distribute, or copy the files as desired by a user, etc.

It should be appreciated that the use of a transport mass storage system in combination with transmission of digital data files through a network link is not limited use in initially establishing the services of a network based mass storage system. For example, a user may decide to include additional files and/or file types in the network based mass storage system backup at some point after initialization of the service. Where such additional files comprise a relatively large amount of digital data files or data, a transport mass storage system may be provided, although transmission of digital data files through a network link and/or communication of digital data files by a transport mass storage system have already been utilized by the user.

Moreover, embodiments of the invention may utilize a transport mass storage system for communicating digital data files, for which hybrid network based digital data file backup services are provided, to user equipment in addition to or in the alternative to transporting digital data files from user equipment to a network based mass storage system. For example, where a user desired to restore a large amount of data to user equipment (e.g., user equipment repaired after a mass storage system failure, newly acquired user equipment, user equipment to be provided with a copy of digital data files from another user equipment, etc.), a transport mass storage system may be utilized to transport a large volume of digital data files from the network based mass storage system to the user equipment. Such use of a transport mass storage system may be in combination with communication of digital data files via other techniques, such as electronic transport using a network link. One or more file manifest, as described above, may be utilized with respect to such transportation of digital data files, if desired.

It should be appreciated that embodiments of the invention provides for storage of digital data files separately from the host systems used by users, thus providing security in that destruction, loss, or failure of such host systems does not affect the availability or viability of the backup copies of the digital data files. Moreover, operation of hybrid network based digital data file backup services in accordance with embodiments of the invention facilitates transfer of very large amounts of digital data files to a network based mass storage system in a fraction of the time, using less resources, and providing an improved user experience, than that of a purely network based solution.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
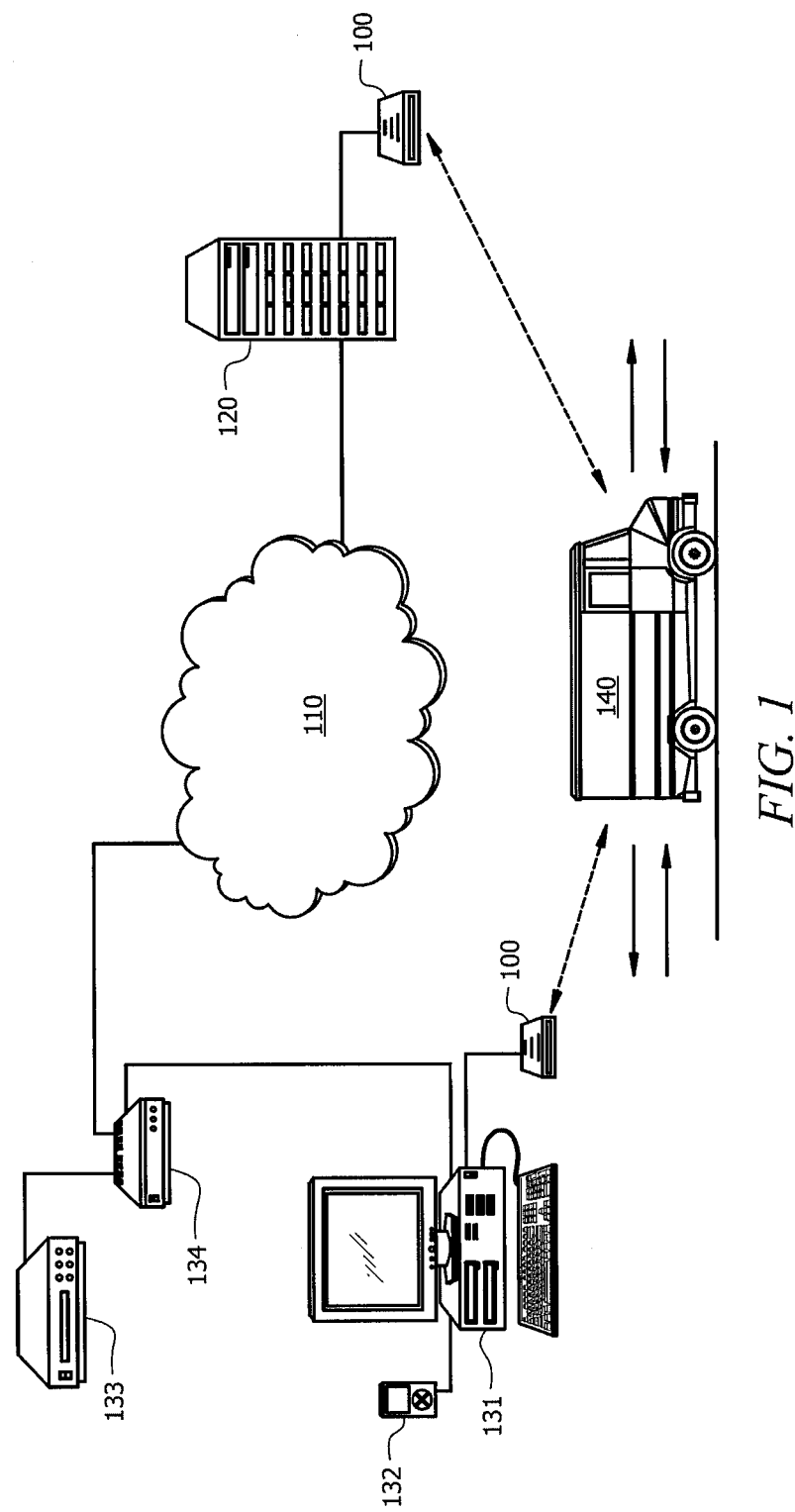
FIG. 1 shows a system adapted to provide hybrid network based backup services according to an embodiment of the invention.

FIG. 1 shows a system adapted to provide a hybrid network based digital data file backup service according to embodiments of the invention. In the embodiment illustrated in FIG. 1, user equipment 131-133 may store large amounts of data in the form of digital data files, such as may comprise digital photos, graphic files, digital music, digital sound recordings, digital videos, multimedia files, databases, program files, calendar files, contacts files, office productivity documents, databases, software, etc. The user equipment storing such data may comprise various system configurations. For example, user equipment 131 may comprise a computer system, such as a PC, notebook computer, network server, etc., having one or more mass storage system associated therewith storing data. User equipment 132 may comprise a portable or handheld system, such as a PES, PDA, PCS, wireless handsets, etc., having one or more mass storage system associated therewith storing data. User equipment 133 may comprise an appliance, such as a DVR, interactive voice response (IVR) system, etc. having one or more mass storage system associated therewith storing data.

Such user equipment may be interconnected for information communication and/or coupled to an external network. For example, the illustrated embodiment includes user equipment 134, such as may comprise a router, switch, gateway, modem, network interface card (NIC), and/or the like, providing communication between various of the user equipment as well as an interface to network 110.

It should be appreciated that user equipment accommodated according to embodiments of the invention may vary in functionality, configuration, number, and topology from that of the illustrated embodiment. For example, although illustrated as interfacing with network 110 through user equipment 134, user equipment 131 and 133 of embodiments may interface directly with network 110 or may interface with network 110 through additional user equipment (not shown). Similarly, although illustrated as interfacing with network 110 through additional user equipment (here, user equipment 131), user equipment 132 may interface with network 110 more directly through user equipment 134 or may interface directly with network 110.

Network 110 of embodiments may comprise one or more network systems, such as the Internet, the public switched telephone network (PSTN), a local area network (LAN), a metropolitan area network (MAN), a wide area network (WAN), a wireless network, a cellular network, a cable transmission system, and/or the like. Network 110 utilized according to embodiments of the present invention provides a broadband network link for use by user equipment 131-134. However, where the user equipment is associated with a home user or small business, it is expected that network 110 provides an asymmetrical network link (e.g., ADSL or cable Internet link), whereby the downlink (from network 110 to user equipment 131-134) provides appreciably greater throughput (e.g., on the order of 10 times, in some instances) than the uplink (from user equipment 131-134 to network 110).

The system illustrated in FIG. 1 further includes network based backup service system 120. Network based backup service system 120 of embodiments includes one or more network based mass storage system adapted to store large amounts of data. For example, although illustrated as a single unit, embodiments of network based backup service system 120 may comprise any number of units, whether disposed locally or remotely with respect to one another, providing network communication, data storage, and other functionality as described herein.

Although a user of user equipment 131-133 may desire to backup digital data files associated with any or all of user equipment 131-133 using network based backup service system 120, the available network links to network 110 may prevent or otherwise frustrate transmission of the digital data files through network 110. For example, transferring copies of 100 gigabytes of digital data files to a network based mass storage system of network based backup service system 120 using an asymmetrical broadband Internet connection may take from 28-30 days, such as due to limited transfer rates, noisy media, network data collisions, network link interruptions, etc. Moreover, service providers (e.g., ISPs and carriers) have implemented decreases in available bandwidth and/or temporary termination of network links where a user is consuming more than some threshold amount of bandwidth for a period of time in order to prevent one user from consuming an unfair amount of bandwidth shared among a plurality of users. Accordingly, embodiments of the present invention implement a hybrid network based backup service in which a transport mass storage system (transport mass storage system 100) is used to physically transport (e.g., using transportation service 140) a large volume of digital data files to be stored by a network mass storage system of network based backup service system 120. As will be better understood from the exemplary embodiments described herein, the foregoing transport mass storage system may be utilized as one of a plurality of digital data file communication techniques implemented with respect to a hybrid network based backup service to provide transport of digital data files (whether in parallel with one or more other transport techniques and/or serially with respect to one or more other transport techniques).

Transport mass storage system 100 of embodiments comprises a non-volatile high capacity (e.g., 200 gigabyte to 2 terabyte) mass storage system having one or more interfaces for coupling to various user equipment. Non-volatile, as used herein, encompasses various configurations of stable memory, whether providing passively persistent storage (e.g., magnetic storage media, optical disk media, flash memory media, etc.) or actively persistent storage (e.g., CMOS SRAM powered by a battery, etc.). Additionally, transport mass storage system 100 is preferably provided in a relatively small form factor (e.g., the size of a compact disk (CD) jewel case, the size of a package of cigarettes, the size of a modern cellular telephone, etc.) and is adapted to be sufficiently rugged to endure shipment as described herein without loss of data. For example, transport mass storage system 100 may comprise a high capacity hard disk drive. Alternatively, transport mass storage system 100 may comprise a high capacity flash memory device, such as a USB flash drive, a secure digital (SD) memory card, an extreme digital (XD) memory card, compact flash (CF) memory card, and/or the like. Embodiments of transport mass storage system 100 may comprise multiple forms of memory, such as hard disk memory, flash memory, dynamic memory, optical memory, and/or read only memory.

Memory of transport mass storage system 100 is preferably adapted to facilitate hybrid network based mass storage system operation. A memory area of transport mass storage system 100 utilized for storage of digital data files during transport is preferably adapted for use with a plurality of host user equipment configurations. For example, such a memory area may be configured as a raw data store, without formatting for a particular file storage protocol, to store data from host systems using different operating systems (e.g., disk operating system (DOS), WINDOWS operating system, MAC operating system, LYNIX operating system, UNIX operating system, etc.). Such a raw data memory area facilitates obscuring access to the memory area utilized for storing digital data files from host systems (e.g., the memory area is not mounted as a disk drive by the operating system when coupled to a host system). Additionally or alternatively, a memory area of transport mass storage system 100 may be utilized for storing an instruction set for controlling operation of the transport mass storage system and/or for providing information facilitating operation as described herein (e.g., cryptographic keys, storage system identification information, information regarding digital data files, etc.). For example, the memory of transport mass storage system 100 may be partitioned to provide a memory area storing instruction sets and/or information facilitating desired operation and the aforementioned raw data memory area. A processor-based system of transport mass storage system 100, as discussed further below, may be utilized to access the instruction sets and/or information facilitating desired operation, to execute an instruction set, to arbitrate communication of digital data files between host systems and the raw data memory area, etc.

Embodiments of transport mass storage system 100 have one or more standardized interfaces, such as a universal serial bus (USB), Institute of Electrical and Electronics Engineers (IEEE) 1394 (FIREWIRE) interface, parallel advanced technology attachment (PATA) interface, serial advanced technology attachment (SATA) interface, Ethernet interface, Personal Computer Memory Card International Association (PCMCIA) interface, peripheral component interconnect (PCI) interface, small computer system interface (SCSI), APPLE IPOD/IPHONE dock interface, and/or the like. A plurality of interfaces may be utilized with respect to a transport mass storage system in order to accommodate various operating conditions. For example, a FIREWIRE interface may be provided upon transport mass storage system 100 to facilitate use with a first type of user equipment and a SCSI interface provided upon transport mass storage system 100 to facilitate use with a second type of user equipment. Similarly, a USB interface may be provided upon transport mass storage system 100 to facilitate use with a wide variety of user equipment for copying digital data files to the transport mass storage system and a SATA interface may be provided upon transport mass storage system 100 to facilitate high speed connection to network based backup service system 120 for copying digital data files from the transport mass storage system.

The memory area of embodiments of the transport mass storage system storing information described above may be utilized to facilitate the use of different interfaces with respect to different host systems. For example, ESN information typically stored to a disk drive may not be available or fully available to hosts through particular interfaces. In particular, although a complete ESN may be retrieved from a disk drive when using a SATA interface, only a portion of the ESN (e.g., least significant bits) may be retrieved from the same disk drive when using a USB interface. Such incomplete ESN information may result in a transport mass storage system failing to appear as unique in a pool of transport mass storage systems, thus increasing a risk that users' data becomes intermingled in a network based mass storage system transfer. However, storage system identification information stored in the memory area of the transport mass storage system as described above may be made fully available irrespective of the particular interface used when connecting the transport mass storage system to a host. Thus, unique identification information may be relied upon to properly associate the transport mass storage system which one or more user equipment, user account, etc.

Transport mass storage system 100 of embodiments comprises a processor-based system (e.g., having a central processing unit (CPU), memory, operating system, etc.) operable to execute an instruction set to provide functionality as described herein (e.g., to identify digital data files to be backed up, to copy digital data files from user equipment, to generate a digital data file manifest, to communicate with a network based backup service system, to verify host user equipment and/or user identify, etc.). For example, transport mass storage system 100 may comprise a disk drive or other mass storage system having processor-based circuitry integrated therewith to provide autonomous control with respect to the operation of transport mass storage system 100. Such operation may comprise controlling the storage of digital data files to and retrieval of digital data files from non-volatile memory of the transport mass storage system, encryption/decryption of digital data files, controlling cryptographic key storage and management, controlling storage and retrieval of storage system identification information, etc.

As will be better understood from the discussion below, transport mass storage system 100 of embodiments comprises material in addition to memory for storing digital data files being backed up. For example, transport mass storage system 100 of embodiments may include storage system identification information (e.g., unique or substantially unique information, such as one or more numeric or alphanumeric string, used in identifying the storage system to a host or other system, such as user equipment, network based mass storage system, etc.). Additionally or alternatively, transport mass storage system 100 of embodiments includes one or more instruction set (e.g., software, firmware, etc.) useful in providing network based backup services as described herein. Such instruction sets may be stored by transport mass storage system 100 for downloading to and/or execution by host user equipment. Alternative embodiments of transport mass storage system 100 may comprise no such instruction set, such as where such instruction sets are provided to a host computer via other means, such as by network link, etc.

It should be appreciated that transport mass storage system 100 may be part of a pool of a plurality of transport mass storage systems used by a network based backup service. Such a pool of transport mass storage systems may comprise any number of transport mass storage systems suitable for serving subscribers to the network based backup service. The transport mass storage systems comprising the pool preferably include transport mass storage systems of different sizes (e.g., ranging from 200 gigabyte to 2 terabyte) for selection of one or more appropriately sized transport mass storage system in a particular situation. Such transport mass storage systems are preferably reusable, such as by implementing data purging techniques (described in further detail below), to provide service with respect to a plurality of different subscribers. Alternative embodiments may uniquely associate a particular transport mass storage system with a particular subscriber account so as to avoid even the appearance that a subscriber's data might remain available to a different subscriber through subsequent use of the transport mass storage system. Another alternative embodiment of the invention may provide single use transport mass storage systems, such that the transport mass storage system is discarded or destroyed after its use by a subscriber.

Figure 2:
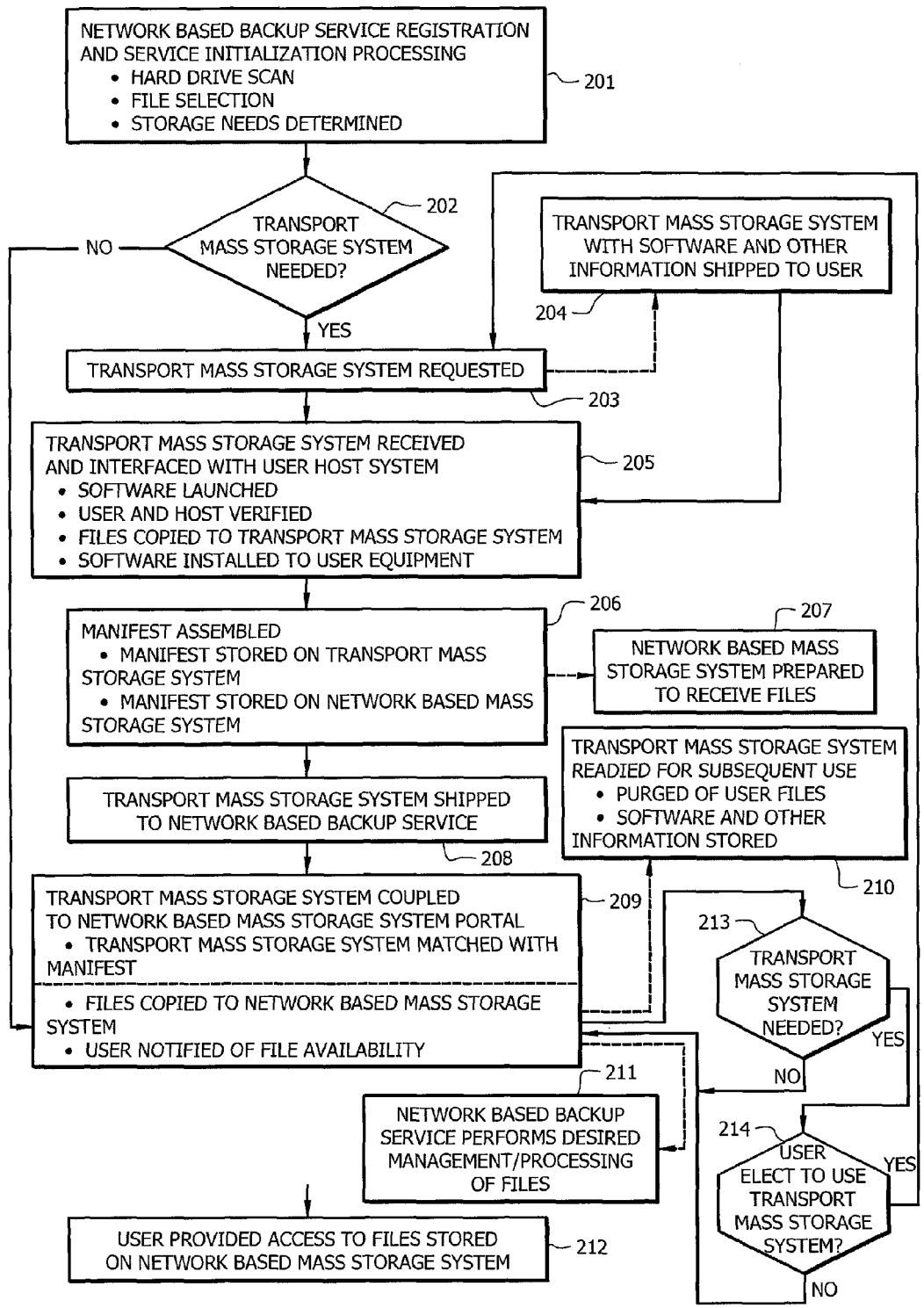
FIG. 2 shows a flow diagram of operation to provide hybrid network based backup services according to an embodiment of the invention.

FIG. 2 shows a flow diagram outlining operation to provide hybrid network based digital data file backup services according to embodiments of the invention. Operation in accordance with the flow diagram of FIG. 2 will be described with reference to the system of FIG. 1 in order to aid the reader in understanding the concepts of the present invention. However, it should be appreciated that the functions of the illustrated flow diagram may be performed using system configurations differing from that illustrated in FIG. 1.

At block 201 of FIG. 2, network based backup service registration and service initialization processing is performed. For example, a user of any of user equipment 131-133 may have elected to subscribe to a network based backup service facilitated by network based backup service system 120. The user may thus operate user equipment, such as user equipment 131, to access network based backup service system 120 to subscribe to the service. Network based backup service system 120 may interface with the user equipment, and thus the user, in various ways, such as by serving a web page and/or downloading software through network 110 to user equipment 131 for performing registration and service initialization. Although the flow diagram is described herein with reference to a user utilizing user equipment 131 to simplify the discussion, it should be appreciated that different and additional user equipment may be operated as described herein.

Various information may be obtained in the registration and service initialization processing, such as user identification, user address, password, level of service desired, service preferences (e.g., default file backup, user selected file backup, file types to be backed up, periodicity of incremental backups, etc.), method of payment (e.g., credit card information, electronic funds transfer information, etc.), identification of user equipment to be served, an operating system or operating systems used by the user equipment to be backed up, configuration information regarding the user equipment to be backed up, physical location of user equipment to be served, file management/processing to be provided by the network based backup service, and/or the like. Such information may be queried from the user, automatically gathered/determined, and combinations thereof. For example, an instruction set performing registration and service initialization processing may analyze user equipment accessible through the user equipment currently in use by the user in order to query the user as to which user equipment backup services are to be provided.

The foregoing information may be utilized in various ways for facilitating network based backup services. For example, user identification and password information may be subsequently utilized to identify a user as an appropriate user of network based backup services. Information identifying user equipment to be served may be subsequently utilized to verify that mass storage systems of appropriate user equipment are being backed up, restored, etc. Such information may be stored by systems of the network based backup service, by user equipment, etc. For example, a small parcel of data (e.g., a "cookie") containing information useful in facilitating hybrid network based backup services (e.g., user identification, password, user equipment identification, etc.) may be provided to user equipment 131 for later use, such as when files are to be copied to transport mass storage system 100.

In accordance with a preferred embodiment, an analysis is performed with respect to the user equipment to be backed up in order to determine how the network based backup service is to be provided. For example, the user may be queried as to the types of files to be backed up (e.g., digital photos, digital movies, digital music, etc.), the approximate or average size of the files, and/or the approximate number of such files, such as where the particular user equipment to be backed up is not the user equipment used to perform the registration or is otherwise not in communication with the user equipment used to perform the registration.

Additionally or alternatively, an instruction set performing registration and service initialization processing may scan the appropriate user equipment mass storage systems to determine the types of files to be backed up, the sizes of the files, the approximate number of such files, the particular files to be backed up, etc., such as where the particular user equipment to be backed up is the user equipment used to perform the registration or is otherwise in communication with the user equipment used to perform the registration. For example, the instruction set performing registration and service initialization may scan one or more user equipment mass storage system to identify digital data files of particular file types (e.g., digital photographs, digital videos, digital music, databases, calendar files, contacts files, office productivity processing files, etc.), such as by file extensions, metadata, etc., digital data files stored in particular file folders or directories (e.g., "my documents" folder, "my photos" folder, "/usr/data" directory, etc.), digital data files having a threshold file size, etc.

User preference information may be provided or queried from the user for use in identifying particular digital data files for backing up and/or not to be backed up. For example, user preferences regarding the particular files, file types, etc. may be utilized by the initial backup software when scanning user equipment mass storage systems for file types, file folders or directories, file sizes, to identify a subset of digital data files meeting the scanning criteria which the user desires to be backed up and/or not to be backed up. User preference information may additionally or alternatively comprise information useful in determining a hierarchy of the digital data files, particular uses to be made of the digital data files when backed up to the network based mass storage system, archiving preferences, etc.

Storage needs for the digital data files to be backed up are preferably determined using the foregoing or similar information. Moreover, the foregoing information may be utilized with respect to other aspects of the hybrid network based mass storage system, such as to prioritize backing up of the digital data files to the network based mass storage system, for selecting a particular transport technique for communicating certain digital data files to the network based mass storage system, etc.

Analysis in addition to or in the alternative to analysis of the aforementioned file information may be performed according to embodiments of the invention. For example, an instruction set performing registration and service initialization processing may analyze network links available to the user equipment in order to determine an approximate or average throughput available for file transfer and other operations.

Having obtained information regarding the files to be backed up, operation provided at block 201 of embodiments may initiate one or more digital data file transport technique. For example, transport of digital data files meeting the user's backup preferences to network based backup service system 120 may be initiated through a network link, e.g., using user equipment 134 and network 110. The order of digital data files transported via the file transport technique may be selected based upon user preference or other information. For example, user input and/or analysis of the digital data files by the instruction set may identify particular files, types of files, sizes of files, file content, etc. as of particular importance or otherwise worthy of priority transport to the network based mass storage system. Additionally or alternatively, an assortment of different types of digital data files (e.g., digital photos, digital music files, digital videos, and multimedia files) for priority transport to the network based mass storage system in order to very quickly provide a variety of digital data files stored to network based backup service system 120 for use and enjoyment of many or all aspects of the network based mass storage system by a user without waiting for transport of all digital data files. Information regarding the particular digital data files being copied to the network based mass storage system may be compiled, such as for use in ensuring that digital data files which have already been backed up are not communicated to the network based mass storage system by another digital data file communication technique where multiple such techniques are used.

At block 202 of the illustrated embodiment a determination is made as to whether transport mass storage system 100 is to be utilized to transport the digital data files to be backed up. For example, where the storage needs for the digital data files to be backed up exceeds a particular storage threshold value (e.g., greater than 10 gigabytes), where the digital data files to be backed up would require longer than a particular transfer threshold time (e.g., greater than 24 hours) to be transmitted through network 110, the available network link or links provide uplink throughput below a particular threshold value (e.g., less than 5 Mbit/s), etc., operation according to embodiments of the present invention may determine that transport mass storage system is needed to transport the digital data files. Additionally or alternatively, a user may be presented with information, such as an estimate of the storage needs for the digital data files to be backed up, an estimate of the time to transmit the digital data files through network 110, etc., and allowed to select whether transport mass storage system 100 is to be used to transport the digital data files.

If it is determined at block 202 that transport mass storage system 100 is not to be used to transport the digital data files, processing according to the illustrated embodiment proceeds to block 209 wherein the digital data files meeting the user's backup preferences are transmitted to a network based mass storage system of network based backup service system 120 through network 110. However, if it is determined that transport mass storage system 100 is to be used to transport the digital data files, processing according to the illustrated embodiment proceeds to block 203.

It should be appreciated that the decision regarding the use of transport mass storage system 100 may be revisited (e.g., from time to time, as a present situation changes, etc.) and thus the determination at block 202 regarding whether or not transport mass storage system 100 is used may subsequently be changed. For example, during transmission of digital data files to the network based mass storage system at block 209, after having initially determined that transport mass storage system 100 is not be used at block 202, it may be determined that transport mass storage system 100 is to be used at block 213. In operation according to an embodiment of the invention a determination may be made to utilize transport mass storage system 100 at block 213 if the transfer of digital data files is taking too long, if the queue of digital data files is greater than a particular threshold (e.g., additional digital data files are added to the user equipment during the transfer), etc. If it is determined at block 213 that transport mass storage system 100 is to be used, processing according to the illustrated embodiment proceeds to block 214 wherein the user is prompted as to whether the user would like to utilize a transport mass storage system to expedite digital data file transfer. If not, processing returns to block 209 for continued transmission of the digital data files. If so, processing proceeds to block 203 to request the transport mass storage system.

At block 203 of the illustrated embodiment a transport mass storage system is requested for use in transporting digital data files between the user equipment and the network based backup service system. For example, an instruction set performing registration and service initialization processing may cause user equipment 131 to send a message to network based backup service system 120 through network 110 requesting that transport mass storage system 100 be shipped to the user.

It should be appreciated that, where transport of digital data files using a combination of digital data file communication techniques are to be used, another of the transport techniques may continue (or be initiated) to operate in parallel (i.e., processes of each communication technique are operable before completion of operation of the other communication technique, although such processes may not be performed simultaneously) with the use of the foregoing requested transport mass storage system. For example, during shipment of the transport mass storage system to a user, copying of files to the transport mass storage system, and/or shipment of the transport mass storage system to the network based mass storage system (i.e., one or more operation of physical transport using the transport mass storage system) embodiments of the invention may provide electronic transport using the network link. Such a combination of digital data file communication techniques may be utilized to minimize the time for transporting all selected digital data files to the network based mass storage system, to optimize the likelihood that particular digital data files (e.g., digital data files having important content) are safely communicated to the network based mass storage system, to reduce delay before a user may use and enjoy the functionality of the network based mass storage system (at least with respect to some digital data files), etc.

In response to the request for a transport mass storage system at block 203, transport mass storage system 100 is configured and shipped to the user at block 204 of the illustrated embodiment. Configuration of transport mass storage system 100 according to embodiments of the invention includes storing appropriate software and/or other information thereto for use in providing hybrid network based backup services. For example, information identifying user equipment for which digital data files are to be backed up may be stored to transport mass storage system 100 for use in verifying subsequently interfaced host user equipment. Similarly, information identifying an appropriate user may be stored to transport mass storage system 100 for use in subsequently verifying the user. User preferences and operation configuration information, cryptographic key information, storage system identification information, and/or other information to facilitate backing up of digital data files as described herein may additionally or alternatively be stored to transport mass storage system 100.

Configuration of transport mass storage system 100 of embodiments may additionally or alternatively operate to associate the particular transport mass storage system 100 with the particular user, subscriber account, user equipment, etc. For example, an electronic serial number (ESN) or other unique identifier of the transport mass storage system (e.g., the aforementioned storage system identification information stored by embodiments of the transport mass storage system) may be associated with the user, subscriber account, and/or user equipment in the network based backup service system so that digital data files returned using the transport mass storage system (as identified using the unique identifier of the transport mass storage system) are properly associated with the user, subscriber account, and/or user equipment. In operation according to an embodiment of the invention, a barcode or other machine readable marking providing storage system identification information upon transport mass storage system 100 may be scanned to uniquely associate the particular transport mass storage system with one or more user equipment, user account, etc. for digital data file transport. Information provided by the machine readable marking may correspond to unique identification information electrically available from the transport mass storage system (e.g., the aforementioned storage system identification information, ESN, etc.). Such unique information may additionally or alternatively be provided to the user equipment, such as part of the aforementioned cookie, to facilitate operation of digital data file backup at the user equipment to provide copies of digital data files only to a properly paired transport mass storage system.

It should be appreciated that transport mass storage system 100 provides a mass storage system capable of carrying large amounts of data to user equipment as well as from user equipment. Accordingly, preferred embodiments store software to transport mass storage system 100 for use in providing hybrid network based backup services and/or to update or add features to user equipment, and thus avoid more time consuming download of such through network 100. For example, initial backup software, incremental backup software, software updates, and/or the like may be stored and transported to user equipment by transport mass storage system 100. Additionally or alternatively, such initial backup software, incremental backup software, software updates, etc. may be provided to user equipment via other means, such as transmission via a network link by an instruction set performing the aforementioned registration and service initialization processing.

The aforementioned initial backup software of embodiments is operable to verify a user, to verify user equipment, to identify digital data files to be backed up, to copy digital data files to transport mass storage system 100, to generate a manifest to manage transporting and/or storage of digital data files, to store a generated manifest to transport mass storage system 100, to transmit a generated manifest to a network based backup service system, to provide information for synchronizing digital data files when a combination of digital data file communication techniques are used, to install software and/or software updates on user equipment, etc. Incremental backup software of embodiments is preferably installed to user equipment by initial backup software and is subsequently operable to periodically (e.g., once a day, once a week, twice a month, etc.) and/or trigger (e.g., upon a threshold amount of data having been added/changed, upon a threshold number of files having been added/changed, upon particular files/file types having been added/changed, etc.) initiate digital data backup to a network based mass storage system, whether using internet 110 and/or transport mass storage system 100. Software updates may be installed to user equipment by initial backup software to provide updates to user equipment operating systems, software, etc.

Various configurations of user equipment, including different computing platforms (e.g., WINDOWS, MAC OS, UNIX, LINUX, etc.) are accommodated according to embodiments of the invention. Accordingly, configuration of transport mass storage system 100 to store software and/or other information thereto according to embodiments of the invention may analyze information regarding the user equipment in order to identify appropriate software and other information. For example, information regarding identification of user equipment to be served, an operating system or operating systems used by the user equipment to be backed up, and configuration information regarding the user equipment to be backed up obtained in the network based backup service registration and service initialization processing (block 201) may be utilized to identify appropriate software and/or other information for storing to transport mass storage system 100. It should be appreciated that such appropriate software and/or other information may not be restricted to that which is directly useful in providing network based backup services. For example, the analysis of user equipment may determine that software updates are available for one or more user equipment and thus provide the appropriate software update for transporting by transport mass storage system 100 merely to provide the update to the user without the user having to actively download the update using network 110.

Transport mass storage system 100 of the illustrated embodiment is shipped using transportation service 140, such as to the user's address, the physical location of the user equipment, etc. Transportation service 140 preferably comprises an overnight or express courier, such as FEDERAL EXPRESS, DHL, UNITED PARCEL SERVICE, UNITED STATES POSTAL SERVICE EXPRESS MAIL, and/or the like, to facilitate rapid delivery of transport mass storage system 100. Of course, other shipping or delivery services may be utilized according to embodiments of the invention, if desired. Moreover, embodiments of the invention may provide for local availability of transport mass storage systems, such as to minimize the time to provide a subscriber with a transport mass storage system. For example, one or more "depots" may be established in various metropolitan areas, such as at chain electronics stores (e.g., BEST BUY, FRY'S ELECTRONICS, OFFICE MAX, OFFICE DEPOT, etc.), where one or more transport mass storage system is made available for use by subscribers to the network based backup service. Accordingly, rather than shipping transport mass storage system 100 to the user at block 204, a local address at which transport mass storage system 100 is available for pickup may be provided to the user. Of course, a delivery service may be utilized to transport a transport mass storage system from such a local depot or from the user's location to an appropriate location for transfer of the digital data files to network based backup service system 120, if desired. As a transport mass storage system is used from such a local depot, a replacement transport mass storage system may be provided to the local depot by the network based backup service.

Irrespective of how a particular transport mass storage system is provided to the user, preferred embodiments of the invention provide for the return of the transport mass storage system to the network based backup service for copying digital data files to a network based mass storage system. According to embodiments of the invention, transport mass storage system is provided to a user with return packaging and shipping label. For example, a prepaid overnight or express courier label may be provided to provide expeditious return of transport mass storage system to the network based backup service.

At block 205 of the illustrated embodiment transport mass storage system 100 is received or otherwise obtained by the user. The user preferably interfaces transport mass storage system 100 with one or more host user equipment, such as user equipment having mass storage systems to be backed up, user equipment in communication with user equipment having mass storage systems to be backed up, etc. Interfacing transport mass storage system 100 preferably involves a simple "plug-in" interface, such as through connecting a standard cable (e.g., USB, FIREWIRE, Ethernet, SCSI, APPLE IPOD/IPHONE dock interface, etc.) between host user equipment and transport mass storage system 100. Embodiments may involve a user installing transport mass storage system 100 in an externally available slot on host user equipment (e.g., PCMCIA, SD memory slot, XD memory slot, CF memory slot, etc.) or in an internally available slot on host user equipment (e.g., PCI bus, etc.).

Once transport mass storage system 100 is interfaced with host user equipment, an instruction set (e.g., software) is preferably launched to control operation in accordance with the concepts of the present invention. For example, upon detecting transport mass storage system 100 having been interfaced, an operating system of the host user equipment may "auto run" or otherwise automatically launch software stored on transport mass storage system 100 to control aspects of digital data file backup. Additionally or alternatively, a processor of transport mass storage system 100 may execute software stored thereon to control aspects of digital data file backup. Of course, a user may manually initiate such software, whether stored on transport mass storage system 100, the host user equipment, or on a system of network 110.

Operation of digital data file backup at the user equipment is preferably controlled to verify that an appropriate user is invoking the process. For example, initial backup software controlling the operation may query a user for identification and password. The user's response may be verified against previously submitted information, such as may be stored to user equipment 131 (e.g., using a cookie) and/or a network based backup service system during the network based backup service registration and service initialization processing, stored to transport mass storage system 100 during configuration, etc. Additionally or alternatively, initial backup software controlling the operation of digital data file backup may verify that appropriate user equipment is in communication, whether directly or indirectly, with transport mass storage system 100. For example, the software may compare user equipment information with user equipment information stored to user equipment 131 (e.g., using a cookie) and/or a network based backup service system during the network based backup service registration and service initialization processing, stored to transport mass storage system 100 during configuration, etc.

In operation according to embodiments, particular user equipment may be associated with particular transport mass storage systems, such as using the above described transport mass storage system unique identifier. Accordingly, when connected to a host system for initiating copying of digital data files to the transport mass storage system, an instruction set may obtain transport mass storage system identification information for confirming that the transport mass storage system and digital data files to be copied properly correspond. Embodiments of the invention may, for example, operate to access storage system identification information stored in the memory of the transport mass storage system, as discussed above, and compare this information to the storage system identification information scanned from the transport mass storage system when shipped to the user, also as discussed above.

It should be appreciated that properly associating a transport mass storage system with user equipment, user account, etc. may provide benefits in addition to assuring that user digital data files are not intermingled by the network based mass storage system. Various use scenarios may, for example, result in an inability to copy digital data files to a transport mass storage system, user dissatisfaction, etc. For example, a user may initially elect to have only a portion of their digital data files (e.g., digital photos) backed up to a network based mass storage system and thus a transport mass storage system sized for those files may be provided to the user. Shortly thereafter (e.g., while the transport mass storage system is in transit to the user), the user may elect to have a significantly larger portion of their digital data files (e.g., digital videos) backed up to the network based mass storage system, and thus a second transport mass storage system appropriately sized to accommodated the additional digital data files may be provided to the user. If, upon receipt of the first transport mass storage system, copying of all the user's digital data files (or perhaps even the digital videos, rather than the digital photos) to the first transport mass storage system were to be attempted, the process may fail due to the memory of the first transport mass storage system being exhausted. By properly associating the particular transport mass storage systems with the appropriate digital data files, such a failure may be avoided. Thus, proper association of a transport mass storage system may be utilized to implement operation of multiple transport mass storage systems with a user equipment.

Other examples of use scenarios facilitated by properly associating a transport mass storage system with user equipment, user account, etc. include cases where a user has a plurality of user equipment for which network based mass storage system services are desired. For example, digital data files for a first user equipment may be identified for backup and a first transport mass storage system provided to the user and digital data files for a second user equipment may be identified for backup and a second transport mass storage system also provided to the user. The memory sizes of the first and second transport mass storage systems may be selected to accommodate the digital data files identified for the respective first and second user equipment. By properly associating the particular transport mass storage system with the appropriate user equipment, a failure to copy all the selected digital data files from one of the user equipment to a transport mass storage system having insufficient memory may be avoided. Similarly, where one transport mass storage system is provided to a user for utilization with respect to a plurality of user equipment, properly associating the transport mass storage system with the appropriate particular user equipment may avoid failures associated with its use. Thus, proper association of transport mass storage systems may be utilized to implement operation of multiple transport mass storage systems with respect to multiple user equipment, single transport mass storage systems with respect to multiple user equipment, etc. according to embodiments of the invention.

Continuing with operation at block 205 of the illustrated embodiment, assuming the user and/or user equipment are successfully verified/associated, digital data files to be backed up are identified for copying from the user equipment to transport mass storage system 100. In an embodiment wherein a combination of digital data file communication techniques are employed (e.g., electronic transport using a network link in addition to physical transport using the transport mass storage system), one or more such other digital data file communication technique may be suspended or ended at block 205 for initiation of digital data file copying to the transport mass storage system. For example, communication of digital data files electronically via a network link may be suspended during copying of digital data files to the transport mass storage system.

The initial backup software preferably provide communications with systems of the network based mass storage system and/or compiles information to facilitate synchronization with respect to transport of digital data files using a combination of digital data file communication techniques. For example, information regarding the particular digital data files being copied to the transport mass storage system (e.g., including digital data file identification information, creation date information, modification date information, checksum information, watermark information, and/or the like) may be provided to a server of the network based mass storage system and/or stored to the transport mass storage system (e.g., as part of manifest information as described below). This digital data file update information may be utilized to ensure that digital data files which are updated on the user's equipment while the transport mass storage system is in transit are properly synchronized between the user's systems and those of the network based mass storage system. For example, such updated digital data files may be communicated using the aforementioned network link while the transport mass storage system is in transit and the foregoing information regarding the particular digital data files copied to the transport mass storage system used to identify particular files stored by the transport mass storage system which are not to be used to overwrite digital data files stored by the network based mass storage system.

In facilitating transport of digital data files to the network based mass storage system, operation of the initial backup software at the user equipment may identify particular digital data files for backup and/or not to be backed up from information obtained during the mass storage system scan of the network based backup service registration and service initialization processing (block 201). Additionally or alternatively, initial backup software controlling digital data file backup operation may scan the appropriate user equipment mass storage systems to determine the types of files to be backed up, the sizes of the files, the number of such files, the particular files to be backed up, etc.

Particular digital data files to be backed up and/or not to be backed up may be identified in a number of ways. Default operation of the initial backup software may scan one or more user equipment mass storage system to identify digital data files of particular file types (e.g., digital photographs, digital videos, digital music, databases, calendar files, contacts files, office productivity processing files, etc.), such as by file extensions, metadata, etc., digital data files stored in particular file folders or directories (e.g., "my documents" folder, "my photos" folder, "/usr/data" directory, etc.), digital data files having a threshold file size, etc. User preference information, such as may have been provided in network based backup service registration and service initialization processing (block 201) or as may be queried from the user, may additionally or alternatively be utilized to identify particular digital data files for backing up and/or not to be backed up. For example, user preferences regarding the particular files, file types, etc. may be utilized by the initial backup software when scanning user equipment mass storage systems for file types, file folders or directories, file sizes, to identify a subset of digital data files meeting the scanning criteria which the user desires to be backed up and/or not to be backed up.

A user may additionally or alternatively provide input to select, whether individually or by type, category, etc., digital data files for backing up and/or not to be backed up. For example, operation of the initial backup software may query a user as to whether a default digital data file backup, a user specified digital data file criteria digital data file backup, a uniquely identified digital data file backup, or a combination thereof should be performed. Accordingly, a user is enabled to essentially perform a "plug-and-play" backup using the default settings or to control the backup to varying levels of granularity and specificity.

It should be appreciated that digital data files that have already been communicated to the network based mass storage system, such as via electronic transport using a network link, may be omitted from (or deleted from) a list of those identified to be backed up using the transport mass storage system. However, where a digital data file that has already been communicated to the network based mass storage system has been modified since its transport to the network based mass storage system (as may be determined by reference to Information regarding the particular digital data files copied to the network based mass storage system), the digital data file may remain in the list of those identified to be backed up and thus the modified digital data file communicated to the network based mass storage system. Embodiments of the invention may operate to copy digital data files to the transport mass storage system that have already been communicated to the network based mass storage system (e.g., through electronic transport using the network link), such as to provide assurance that the digital data file stored by the network based mass storage system has not been corrupted.

In operation according to preferred embodiments, digital data files stored on mass storage systems of user equipment identified for backing up are copied from the user equipment to transport mass storage system 100. For example, transport mass storage system 100 of the illustrated embodiment is interfaced directly with user equipment 131. Accordingly, digital data files stored on a mass storage system of user equipment 131 may be identified and copied to transport mass storage system 100. It should be appreciated that copying of such digital data files via direct connection to the user equipment may be accomplished in relatively little time (e.g., on the order of 1-2 hours for 100 gigabytes, rather than 28-30 days for 100 gigabytes to be transmitted through an asynchronous network link of network 110).

The digital data files are preferably stored on transport mass storage system 100 in a secure manner. For example, the digital data files of a preferred embodiment are encrypted, such as by operation of the initial backup software, prior to their storage on transport mass storage system 100. A cryptographic key or cryptographic key information, such as may be provided during network based backup service registration and service initialization processing (block 201) or stored on transport mass storage system 100 (e.g., stored in a memory area of transport mass storage system 100 utilized for providing information facilitating operation as described above), may be utilized to encrypt the digital data files. According to a preferred embodiment, a public cryptographic key is used to encrypt the digital data files, whereby a corresponding private cryptographic key (e.g., identified using storage system identification information available from the transport mass storage system as described above) held by the network based backup service is used to decrypt the digital data files for storage on a network based mass storage system and/or subsequent use.

Transport mass storage system 100 of the illustrated embodiment is in communication, albeit indirectly, with user equipment 132-134. Accordingly, digital data files stored on a mass storage system of user equipment 132 and/or 133 may additionally or alternatively be identified and copied to transport mass storage system 100, such as through user equipment 131 and/or 134. Of course, transport mass storage system 100 of embodiments may be coupled directly to other and different user equipment, such as to couple directly to any of user equipment 132-134. Accordingly, transport mass storage system 100 may be utilized to provide backup services with respect to one or more pieces of user equipment (e.g., a plurality of individual computer systems in a user's home or office, computers of a local area network, etc.).

Operation of the illustrated embodiment at block 205 is not limited to copying digital data files from user equipment mass storage systems. Accordingly, embodiments of the invention operate to copy one or more digital data files from transport mass storage system 100 to appropriate user equipment. For example, initial backup software may operate to install software, software updates, and other information onto user equipment. According to a preferred embodiment of the invention, initial backup software operates to install incremental backup software to user equipment for controlling subsequent operation of the user equipment to periodically and/or trigger initiate digital data backup to a network based mass storage system. Additionally or alternatively, software updates may be installed to user equipment by initial backup software to provide updates to user equipment operating systems, software, etc.

Figure 3:
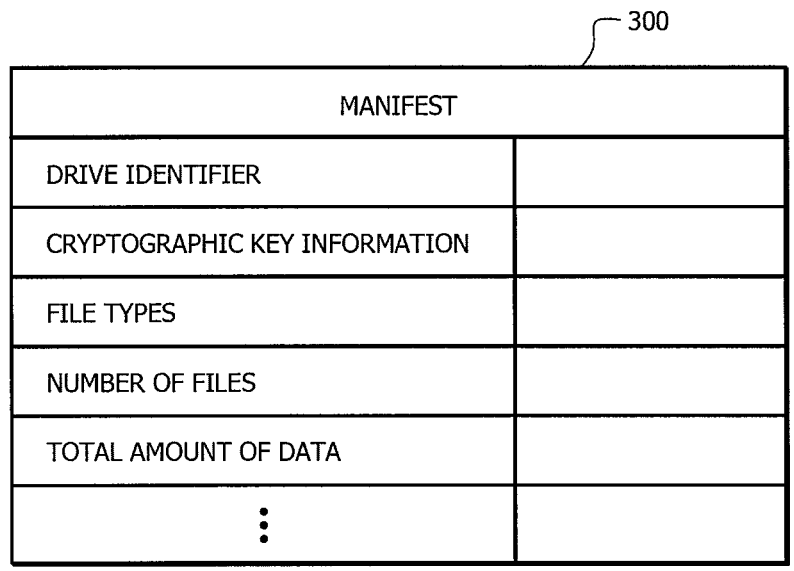
FIG. 3 shows a file manifest as may be used by a hybrid network based backup service system of an embodiment of the invention.

At block 206 of the illustrated embodiment a manifest to manage transporting and/or storage of digital data files. For example, during operation identifying digital data files for backing up and/or copying digital data files to a transport mass storage system, the initial backup software may operate to create a manifest including information such as identification of the digital data files backed up, file size information, cryptographic key information, user identification information, host system information, a number of files being transferred, a location of storage on the user equipment of each file being transferred, file types for the files being transferred, etc., as represented by manifest 300 of FIG. 3. Manifest 300 of embodiments is preferably stored on transport mass storage system 100, along with the digital data files, for use by the network based digital data file backup service. For example, manifest information may be used to confirm that all the digital data files have been received, to provide a digital record of all files being transported, to provide information regarding the storage needed for the files, to confirm that the files have not been corrupted or altered, to associate the digital data files with the appropriate user's account, etc. Such manifest information may additionally or alternatively be utilized for proper synchronization of the user's digital data files when a combination of digital data file communication techniques (e.g., physical transport using the transport mass storage system and electronic transport using the network link) are used.

Embodiments of initial backup software additionally or alternatively operate to communicate the foregoing manifest electronically, such as through network 110, from the user equipment (e.g., user equipment 131) to network based backup service system 120. For example, manifest 300 may be communicated electronically upon completion of operation copying the digital data files to transport mass storage system 100. Manifest 300, as electronically communicated to network based backup service system 120, is used in the illustrated embodiment to facilitate making an appropriate amount of storage in a mass storage system of network based backup system 120 available for the later arrival of transport mass storage system 100 transporting the digital data files at block 207. Additionally or alternatively, manifest 300 transmitted separately from transport mass storage system 100 may be utilized to provide a digital record of all files being transported, to verify that the digital data files transported by transport mass storage system 100 have not been altered, corrupted, etc.

The manifest is preferably stored on transport mass storage system 100 and/or transmitted through network 110 in a secure manner. For example, manifest 300 of a preferred embodiment is encrypted, such as by operation of the initial backup software, prior to its storage on transport mass storage system 100 or transmission through network 110.

Figure 4:
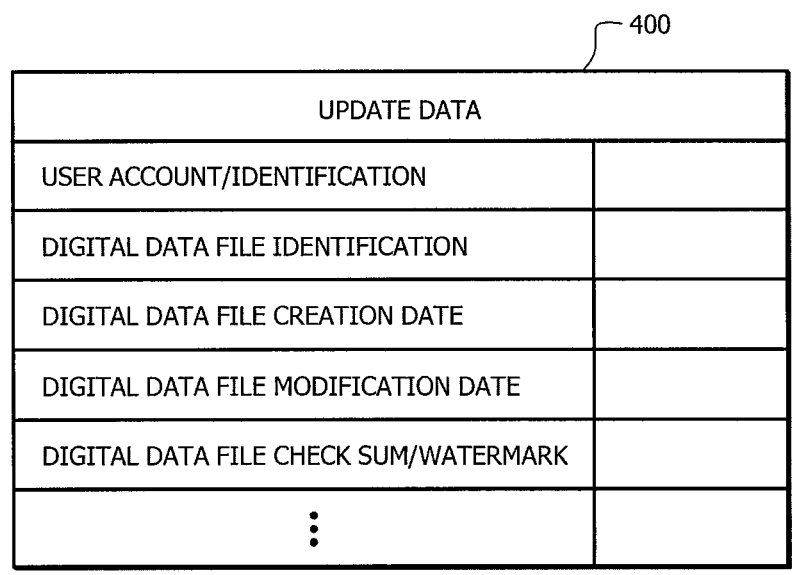
FIG. 4 shows a update data file as may be used by a hybrid network based backup service system of an embodiment of the invention.

In an embodiment wherein a combination of digital data file communication techniques are employed (e.g., electronic transport using a network link in addition to physical transport using the transport mass storage system), one or more such other digital data file communication technique may be restarted or initiated at block 206 for communication of subsequently modified digital data files, added digitally data files, selected digital data files, etc. to the network based mass storage system. For example, communication of digital data files electronically via a network link may be restarted after having been suspended during copying of digital data files to the transport mass storage system. It should be appreciated that such other digital data file communication techniques may continue to communicate digital data files which were copied to the transport mass storage system unless and until notified by the network based mass storage system that such digital data files have been successfully received by the network based mass storage system, such as to mitigate risk of loss if the user equipment and the transport mass storage system were to be destroyed prior to receipt of the transport mass storage system at the network based mass storage system. Such communication of digital data files during the time in which the transport mass storage system is in transit may select an order of particular files for communication in accordance with the aforementioned hierarchy (e.g., to communication more important files, particular selected files, etc. first).

Where such other digital data file communication techniques are used during transportation of the transport mass storage system, embodiments of the invention may operate to track the modified or updated digital data files which are communicated to the network based mass storage system in order to facilitate synchronization with respect to transport of digital data files. For example, such digital data file update information may be utilized in combination with the aforementioned manifest information to ensure that more current versions of digital data files stored by the network based mass storage system are not overwritten by older copies of digital data files present upon a transport mass storage system subsequently coupled to the network based mass storage system. Thus, information regarding the particular digital data files being copied to the network based mass storage system (e.g., including digital data file identification information, creation date information, modification date information, checksum information, watermark information, and/or the like), as represented by update data 400 of FIG. 4, may be compiled (e.g., by a server of the network based mass storage system and/or user equipment) for use in ensuring that digital data files which are updated on the user's equipment while the transport mass storage system is in transit are properly synchronized between the user's systems and those of the network based mass storage system. Update data 400 of embodiments may be stored by an associated user equipment (e.g., user equipment 131, 132, and/or 133) and/or by network based backup service system 120.

At block 208 of the illustrated embodiment transport mass storage system 100 is shipped using transportation service 140, such as to the physical location of network based backup system 120, a nearest network based backup service mass storage system portal, etc. Transportation service 140 used in transporting transport mass storage system 100 preferably comprises an overnight or express courier, such as FEDERAL EXPRESS, DHL, UNITED PARCEL SERVICE, UNITED STATES POSTAL SERVICE EXPRESS MAIL, and/or the like, to facilitate rapid delivery of transport mass storage system 100. Of course, other shipping or delivery services may be utilized according to embodiments of the invention, if desired. Moreover, a different transportation service and/or type of service may be utilized when transporting transport mass storage system 100 to network based backup system 120 than may have been used when transporting transport mass storage system 100 to the user.

It should be appreciated, however, that the use of express courier services as transportation service 140 both to and from network based backup system 120 may result in the transportation of digital data files to the network based backup service in as little as 2 days from a subscriber's initial registration for the service. Where the above mentioned local depot service is utilized with respect to transport mass storage system 100, transportation of digital data files to the network based backup service may be accomplished in as little as 1 day from a subscriber's initial registration for the service. Of course, where same-day transportation services are utilized, these times may be reduced even further. Nevertheless, any of the foregoing, as well as even much slower transportation services, result in large volume digital data files (e.g., 20 gigabytes or greater) being provided to the network based backup service system in appreciably less time than if network 110 were used for their transmission.

At block 209 of the illustrated embodiment transport mass storage system 100 is received by the network based backup service. Transport mass storage system 100 is preferably interfaced with network based backup system 120 for copying files to a network based mass storage system thereof. The foregoing interfacing of transport mass storage system 100 with network based backup system 120 may involve a plug-in interface, such as through connecting a standard cable (e.g., USB, FIREWIRE, Ethernet, SCSI, APPLE IPOD/IPHONE dock interface, etc.) between a portal of network based backup system 120 and transport mass storage system 100, installing transport mass storage system 100 in an externally available slot on a system of network based backup system 120 (e.g., PCMCIA, SD memory slot, XD memory slot, CF memory slot, etc.), or installing transport mass storage system 100 in an internally available slot on a system of network based backup system 120 (e.g., PCI bus, etc.).

According to embodiments of the invention, an interface (e.g., SATA interface) of transport mass storage system providing higher speed copying of digital data files may be utilized when copying digital data files to systems of the network based mass storage system than the interface (e.g., USB) used when the transport mass storage system was coupled to user equipment for copying digital data files there-from. Such a configuration facilitates the use of readily available, user friendly interfaces by the users while allowing high speed, bulk handling of data transfer at the systems of the network based mass storage system.

Once transport mass storage system 100 is interfaced with network based backup system 120, an instruction set (e.g., software) of network based backup system 120 preferably associates the digital data files with an appropriate user, subscriber account, and/or user equipment. For example, software of network based backup system 120 may access unique identifier information (e.g., ESN or other storage system identification information) of transport mass storage system for determining which subscriber account the digital data files transported by transport mass storage system 100 are associated with. The unique identifier information may have been stored in associate with the user account when transport mass storage system 100 upon dispatch to the user. Additionally or alternatively, the subscriber account may be identified by reference to the manifest.

Assuming that the transport mass storage system has been properly associated with a user account etc, systems of the network based mass storage system may be prepared to receive digital data files stored on the transport mass storage system and to integrate those digital data files with other digital data files of the user stored by the network based mass storage system. In an embodiment wherein a combination of digital data file communication techniques are employed (e.g., electronic transport using a network link in addition to physical transport using the transport mass storage system), one or more such other digital data file communication technique may be suspended or ended at block 209 for initiation of digital data file copying from the transport mass storage system. For example, communication of digital data files electronically via a network link may be suspended during copying of digital data files from the transport mass storage system to the network based mass storage system.

Manifest information, as provided by manifest 300, may be used to confirm that all the digital data files have been received, that the files have not been corrupted or altered, to associate the digital data files with the appropriate user's account, etc. For example, digital data files stored on transport mass storage system 100 may be analyzed and the data from such analysis compared to data in manifest 300, as received electronically or as stored on transport mass storage system 100, to determine if there are discrepancies indicative of the digital data files having been corrupted or altered. Similarly, manifest 300 as received electronically and as stored on transport mass storage system 100 may be compared to determine if there are any discrepancies indicative of the digital data files or manifest having been corrupted or altered. Manifest 300 and/or other information available to network based backup service system 120 may be utilized for proper synchronization of the user's digital data files when a combination of digital data file communication techniques (e.g., to ensure that an old version of a digital data file stored on transport storage system 100 does not overwrite a newer version of the digital data file stored by network based backup service system 120). For example, digital data files stored by the network based mass storage system which are identified as being a more recent version using information of manifest 300 and/or digital data file update information than digital data files stored on transport mass storage system 100 may be omitted from (or deleted from) a list of those identified to be copied from the transport mass storage system.

Assuming transport mass storage system 100 is properly associated with a subscriber account or otherwise identifiable to a user or user equipment, and the digital data files transported thereby are not corrupted or otherwise undesirably altered, the illustrated embodiment operates to copy digital data files (e.g., the digital data files identified as not having already been updated on the network based mass storage system) stored transport storage system 100 to mass storage systems of network based backup system 120. The digital data files are preferably stored on a mass storage system of network based backup system 120 in a manner to facilitate access by a user via network 110. For example, the mass storage systems of network based backup system 120 may provide a virtual mass storage system for user equipment 131-133 upon which the digital data files are provided in a hierarchy or directory structure native to the user equipment. Digital data file hierarchical and/or directory structure data with respect to the digital data files may be provided to network based backup system 120 using manifest 300.

The digital data files are preferably stored on transport mass storage system 100 in a secure manner for transportation. Accordingly, embodiments operate to decrypt the digital files, such as by operation of software of network based backup system 120, prior to their storage on a mass storage system of network based backup system 120. An appropriate cryptographic key may be identified for use in the foregoing decryption using a cryptographic key or cryptographic key information stored in manifest 300, or otherwise identified with the digital data files to be backed up. According to a preferred embodiment, a public cryptographic key is used to encrypt the digital data files, thus a corresponding private cryptographic key held by the network based backup service may be used to decrypt the digital data files for storage on a network based mass storage system and/or subsequent use.

Embodiments of the invention operate to confirm that the digital data files transported by the transport mass storage system are up-to-date, or otherwise represent the then current state of files desired to be backed up by a user. For example, embodiments of the invention operate such that network based backup system 120 communicates with user equipment corresponding to the files transported by transport mass storage system 100, such as using network 110, to determine if any new files meeting the backup criteria have been added to the user equipment mass storage system, any of the files transported have been altered as stored by the user equipment mass storage system, etc. after the copying the files from the user equipment mass storage system to the transport mass storage system. Such embodiments operate to update the files copied to the network based storage system to include such changes to the files stored by the user equipment mass storage system by transporting the updates through network 110.

Continuing with operation at block 209 of the illustrated embodiment, in an embodiment wherein a combination of digital data file communication techniques are employed (e.g., electronic transport using a network link in addition to physical transport using the transport mass storage system), one or more such other digital data file communication technique may be restarted or initiated at block 209 for communication of subsequently modified digital data files, added digitally data files, selected digital data files, etc. to the network based mass storage system. For example, communication of digital data files electronically via a network link may be restarted after having been suspended during copying of digital data files from the transport mass storage system.

Network based backup system 120 preferably provides a communication to the user, such as by email, voice mail, etc., that backing up of the digital data files has been completed and the files are available for use by the user at block 209. Such or similar communication may additionally or alternatively serve to notify systems and/or software (e.g., user equipment, incremental backup software, etc.) that the digital data files are available on network based backup system 120, the particular location the digital data files are located on mass storage systems of network based backup system 120, how to access the digital data files stored on mass storage systems of network based backup system 120, and/or the like.

Having copied the digital data files to be backed up from transport mass storage system 100 to mass storage systems of network based backup system 120, embodiments of the invention operate to purge or otherwise remove user data from transport mass storage system 100 at block 210. An instruction set (e.g., software) of network based backup system 120 or of a processor-based embodiment of transport mass storage system 100 may operate to format, overwrite, etc. the mass storage of transport mass storage system 100. For example, one or more data pattern may be written over all memory locations of transport mass storage system 100 (or all memory locations having had user data stored therein) to purge the memory of all user data. Having purged transport mass storage system 100 of user data, transport mass storage system 100 may be returned to a pool of transport mass storage systems for subsequent use to provide transportation of other user data, perhaps with various network based backup service software and/or other material stored or refreshed thereon.

Systems of network based backup system 120 may provide more than storage of the digital data files, as shown in block 211 of the illustrated embodiment. Network based backup system 120 of embodiments may operate to organize, catalog, or otherwise manage the digital data files. For example, software of network based backup system 120 may analyze the digital data files (e.g., using optical character recognition, voice recognition, image recognition, etc.), metadata associated with the digital data files, and/or the like to organize files into albums. Additionally or alternatively, network based backup system 120 may operate to augment, correct, or otherwise process data of the digital data files. For example, software of network based backup system 120 may operate to perform processing, such as image color correction, data correction, etc., with respect to the digital data files.

Network based backup system 120 of embodiments may additionally or alternatively operate to distribute or copy the digital data files as desired by a user. For example, software of network based backup system 120 may operate to push particular digital data files to various user equipment, such as to provide the most recent or current version of documents from a first user computer system (e.g., a desktop PC) to a second user computer system (e.g., a notebook PC) so the second user computer system is maintained without user interaction. Similarly, software of network based backup system 120 may act in accordance with user preferences to distribute particular digital data files (e.g., digital photo albums) to one or more location (e.g., a MYSPACE account, a FACEBOOK account, etc.). Rather than distributing the digital data files, embodiments may provide access to the digital data files stored on mass storage systems of network based backup system 120, such as through hyper links, to thereby leverage the storage space provided by the mass storage systems.

At block 212 of the illustrated embodiment network based backup system 120 provides access to the backed up digital data files stored on mass storage systems of network based backup system 120. That is, having stored copies of the user's digital data files to mass storage systems of network based backup system 120, the illustrated embodiment allows access to those files to the appropriate user, user equipment, etc., such as through the use of a password protected network interface, a virtual drive interface implemented with respect to the user equipment, incremental backup software, and/or the like. For example, network based backup system 120 may provide a network portal having a document viewer, video player, video editor, photo viewer, photo editor, etc. for facilitating user assess and use of the digital data files stored by network based backup system 120.

Access to the digital data files provided by network based backup system 120 of embodiments facilitates various uses of and operations with the digital data files. For example, the user may from time-to-time supplement the backed up digital data files, such as through regularly scheduled and/or ad hoc incremental digital data file backup operations. Such incremental digital data file backup operations preferably provide for transmission of appropriate digital data files through a network link. Embodiments may employ incremental backups to backup files or file types from an initial backup that have been changed, added, etc., to provide a user an opportunity to have files which were selected not to be backed up in an initial backup to be backed up, etc. Additionally or alternatively, a user may access the digital data files stored by network based backup system 120 to restore data to user equipment, to transfer data to different user equipment, to remotely access data, etc.

Embodiments have been described with respect to a hybrid network based backup service providing initial transportation of a large volume of digital data files using a transport mass storage system and transportation of digital data files associated with incremental backups using network links. Embodiments of the invention, however, may provide for use of a transport mass storage system for some incremental or subsequent digital data file backup operations. For example, where a large amount of data has been changed or added (e.g., a large number of photo files are stored to a computer after a user's return from a vacation), and thus the incremental or other subsequent backup includes a large volume of digital data files, or where a subsequent "full" backup operation is performed to "refresh" the digital data files stored by network based backup system 120, embodiments may again utilize a transport mass storage system for transporting some or all digital data files to be backed up. Incremental backup software may, for example, request (or allow a user to elect to request) a transport mass storage system as set forth above with respect to block 203, and thereafter perform backup operations as set forth in blocks 205-211 above. Such incremental or subsequent backup operations may utilize a combination of digital data file communication techniques (e.g., physical transport using the transport mass storage system and electronic transport using the network link), as described above.

Although embodiments have been described herein with respect to transport mass storage system 100 providing transportation of digital data files for a user and associated user equipment, it should be appreciated that transport mass storage systems of embodiments may provide for transportation of digital data files for a plurality of user equipment and/or user accounts. For example, a single transport mass storage system may be utilized to copy digital data files from multiple user accounts on a same user equipment (e.g., WINDOWS based PC having multiple user accounts established thereon), such as by interfacing the transport mass storage system to the user equipment when logged in as different users. Similarly, a single transport mass storage system may be utilized to copy digital data files from a plurality of different user equipment. The various digital data files associated with such different user accounts and/or different user equipment may be managed using associated manifests (or a single aggregated manifest).

Embodiments have been described herein with respect to using transport mass storage systems for transporting various forms of user digital data files from user equipment to a network based backup system. It should be appreciated, however, that concepts of the present invention may be applied to situations wherein one or more transport mass storage system is used to transport a user's digital data files from systems other than the user's equipment. For example, a user may provide a large number of printed photos to a service provider for conversion to digital form. The service provider may use a transport mass storage system and/or the forgoing transmission techniques, after having converted the photos to digital data files, for transport of the digital data files to a network based backup system for access by the user. The digital data files may be transferred directly to an account associated with the user or an account may be created for the user. The user may thereafter be provided access to the digital data files as described above.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   providing communication of digital data files between a user equipment and a network based mass storage system for storage using a combination of digital data file communication techniques in parallel, the combination of digital data file communication techniques comprising at least a first digital data file communication technique and a second digital data file communication technique, wherein the first digital data file communication technique and the second digital data file communication technique utilize a different media for communicating digital data files between the user equipment and the network based mass storage system; and
   controlling storing of digital data files communicated to the network based mass storage system using the first and second digital data file communication techniques to prevent overwriting a modified digital data file communicated to the network based mass storage system by one of the first and second digital data file communication techniques with an unmodified digital data file communicated to the network based mass storage system by the other one of the first and second digital data file communication techniques.

2. The method of claim 1, further comprising:
   compiling digital data file update information for use in the controlling.

3. The method of claim 1, further comprising:
   selecting digital data files for communication using a particular one of the first and second digital data file communication techniques to cause a variety of digital data file types to be communicated using a desired media of the first and second communication technique media.

4. The method of claim 1, wherein the second digital data file communication technique comprises physical transport of digital data files using a transport mass storage system.

5. The method of claim 4, wherein the first digital data file communication technique comprises electronic transport using a network link.

6. The method of claim 4, further comprising:
   providing the transport mass storage system for use with respect to the user equipment;
   copying selected digital data files from the user equipment mass storage system to the transport mass storage system;
   transporting the transport mass storage system to a location associated with the network based backup system; and
   copying the digital data files from the transport mass storage system to a mass storage system of the network based backup system.

7. The method of claim 4, wherein the providing a transport mass storage system comprises:
   associating the transport mass storage system with a user account of the network based backup system and with the user equipment.

8. The method of claim 1, further comprising:
   analyzing, under control of an instruction set operable with a processor, digital data files of the user equipment to determine file transportation information;
   determining, using the file transportation information, whether the files are to be communicated between the user equipment and the network based backup system using a transport mass storage system as one of the first and second digital data file communication techniques;
   if the files are to be transported to the network based backup system using a transport mass storage system providing a transport mass storage system for use with the user equipment, copying selected digital data files to the transport mass storage system, and transporting the transport mass storage system containing the digital data files between the user equipment and the network based mass storage system.

9. A method comprising:
   analyzing, under control of an instruction set operable with a processor, information associated with digital data files of a user equipment to determine file transportation information;
   determining, using the file transportation information, a hierarchy of digital data files for communication between the user equipment and a network based mass storage system;
   selecting digital data files for communication using a particular one of first and second digital data file communication techniques in accordance with the hierarchy of digital data files, wherein the first digital data file communication technique and the second digital data file communication technique utilize a different media for communicating digital data files between the user equipment and the network based mass storage system; and
   providing communication of the digital data files between the user equipment and the network based mass storage system for storage using a combination of digital data file communication techniques in parallel, the combination of digital data file communication techniques comprising at least the first digital data file communication technique and the second digital data file communication technique.

10. The method of claim 9, wherein the information associated with the digital data files comprises information regarding a type of digital data file content, and wherein the determining a hierarchy determines a hierarchy based upon type of digital data file content to provide communication using a desired media of the first and second communication technique media for a particular type of digital data file content.

11. The method of claim 9, wherein the information associated with the digital data files comprises information regarding a size of digital data file, and wherein the determining a hierarchy determines a hierarchy based upon size of digital data file to provide communication using a desired media of the first and second communication technique media for digital data files meeting a size metric.

12. The method of claim 9, wherein the information associated with the digital data files comprises preference information provided by a user, and wherein the determining a hierarchy determines a hierarchy based upon the user preference information to provide communication using a desired media of the first and second communication technique media for digital data files meeting an aspect of the preference information.

13. A method comprising:
providing communication of digital data files between a user equipment and a network based mass storage system for storage using a combination of digital data file communication techniques in parallel, the combination of digital data file communication techniques comprising at least a first digital data file communication technique and a second digital data file communication technique, wherein the first digital data file communication technique and the second digital data file communication technique utilize a different media for communicating digital data files between the user equipment and the network based mass storage system, the providing communication of digital data files between the user equipment and the network based mass storage system comprising:
initiating communication of digital data files using the first communication technique;
suspending communication of digital data files using the first communication technique in order to perform a first process associated with communication of digital data files using the second communication technique;
performing the first process associated with communication of digital data files using the second communication technique while communication of digital data files using the first communication technique are suspended;
restarting communication of digital data files using the first communication technique after performance of the first process associated with communication of digital data files using the second communication technique; and
performing a second process associated with communication of digital data files using the second communication technique while communication of digital data files using the first communication technique continues.

14. A system comprising:
at least one transport mass storage system configured for physically transporting files between user equipment and a network based mass storage system;
a network based mass storage system having at least one mass storage system and a transport mass storage system interface adapted to accept transfer of the files transported by transport mass storage systems of the at least one transport mass storage system and a network interface adapted to accept transfer of files transported from user equipment by a network;
an instruction set adapted to control communication of files between the user equipment and the network based mass storage system using a transport mass storage system of the at least one transport mass storage system and the network interface in parallel; and
an instruction set adapted to control storing of files communicated to the network based mass storage system using the transport mass storage system interface and the network interface to prevent overwriting a modified file communicated to the network based mass storage system by one of the transport mass storage system interface and the network interface with an unmodified file communicated to the network based mass storage system by the other one of the transport mass storage system interface and the network interface.

15. The system of claim 14, further comprising:
an instruction set adapted to determine if files stored by the user equipment are to be transported to the network based backup system using the transport mass storage system of the at least one transport mass storage systems.

16. The system of claim 14, wherein the at least one transport mass storage system comprises a plurality of transport mass storage systems, wherein the transport mass storage system of the at least one transport mass storage system comprises a transport mass storage system selected from the plurality of transport mass storage systems having a memory capacity corresponding to an aggregated size of files to be communicated between the user equipment and the network based mass storage system.

17. The system of claim 14, wherein the transport mass storage system comprises a first interface for interfacing with the user equipment and a second interface for interfacing with the network based mass storage system.

18. The system of claim 17, wherein the first interface comprises a universal serial bus (USB) interface and the second interface comprises a serial advanced technology attachment (SATA) interface.

19. The system of claim 14, wherein the transport mass storage system of the at least one transport mass storage system comprises hard disk drive mass storage.

20. The system of claim 14, wherein the transport mass storage system of the at least one transport mass storage system comprises flash memory mass storage.

21. The system of claim 14, wherein the transport mass storage system of the at least one transport mass storage systems comprises unique identification information electronically readable by a host system.

22. The system of claim 21, wherein the transport mass storage system is adapted to render a complete string of the unique identification information accessible to host systems using a plurality of different interfaces to access memory of the transport mass storage system.

23. The system of claim 21, wherein the unique identification information is stored to a first memory partition of the transport mass storage system which is separate from a second memory partition used for storing the files transported between the user equipment and the network based mass storage system.

24. The system of claim 23, wherein the transport mass storage system comprises a processor to facilitate access to the first memory partition and the second memory partition by host systems using different operating system platforms.

25. A method comprising:
analyzing files of a user equipment mass storage system to determine file transportation information;
determining, using the file transportation information, files to be transported to a network based storage system using a first file communication technique and files to be transported to the network based storage system using a second file communication technique, wherein the first file communication technique and the second file communication technique utilize a different media for communicating files between the user equipment and the network based storage system;
communicating, using the first file communication technique, the files determined to be transported to the network based storage system using the first file communication technique; and
communicating, using the second file communication technique in parallel with the first file communication technique, the files determined to be transported to the network based storage system using the second file communication technique; and
controlling storing of files communicated to the network based mass storage system using the first and second file communication techniques to prevent overwriting a modified file communicated to the network based mass storage system by one of the first and second file communication techniques with an unmodified file communicated to the network based mass storage system by the other one of the first and second file communication techniques.

26. The method of claim 25, wherein one of the first and second file communication techniques comprises use of a transport mass storage system.

27. The method of claim 26, wherein the other one of the first and second file communication techniques comprises use of a network link between the user equipment and the network based mass storage system.

28. The method of claim 27, further comprising:
for files to be transported to the network based storage system using the transport mass storage system:
providing a transport mass storage system for use with respect to the user equipment mass storage system;
copying the files from the user equipment to the transport mass storage system;
transporting the transport mass storage system to a location associated with the network based storage system; and
copying the files from the transport mass storage system to a mass storage system of the network based storage system; and
for files to be transported to the network based storage system using the network link:
copying the files from the user equipment to the network based storage system using a network link.

29. The method of claim 25, further comprising:
selecting files for communication using a particular one of the first and second file communication techniques based upon type of digital data file content.

30. The method of claim 25, further comprising:
selecting files for communication using a particular one of the first and second file communication techniques based upon size of digital data file.

31. The method of claim 25, further comprising:
selecting files for communication using a particular one of the first and second file communication techniques based upon user preference information.

32. The method of claim 25, further comprising:
selecting files for communication using a particular one of the first and second file communication techniques to cause a variety of file types to be communicated using a desired media of the first and second communication technique media.

33. The method of claim 25, further comprising:
initiating communication of files using the first file communication technique;
suspending communication of files using the first file communication technique in order to perform a first process associated with communication of files using the second file communication technique;
performing the first process associated with communication of files using the second file communication technique while communication of files using the first file communication technique is suspended;
restarting communication of files using the first file communication technique after performance of the first process associated with communication of files using the second file communication technique; and
performing a second process associated with communication of files using the second file communication technique while communication of files using the first file communication technique continues.

* * * * *